(12) United States Patent
Lee et al.

(10) Patent No.: US 11,296,331 B2
(45) Date of Patent: Apr. 5, 2022

(54) AMPOULE-TYPE RESERVE BATTERY

(71) Applicant: TAEYOUNG INDUSTRY CORP., Miryang-si (KR)

(72) Inventors: Nam Hoon Lee, Miryang-si (KR); Young Min Ko, Cheonan-si (KR)

(73) Assignee: TAEYOUNG INDUSTRY CORP., Miryang-si (KR)

( * ) Notice: Subject to any disclaimer, the term of this patent is extended or adjusted under 35 U.S.C. 154(b) by 0 days.

(21) Appl. No.: 17/080,744

(22) Filed: Oct. 26, 2020

(65) Prior Publication Data

US 2022/0029142 A1 Jan. 27, 2022

(30) Foreign Application Priority Data

Jul. 21, 2020 (KR) .................. 10-2020-0090136

(51) Int. Cl.
| | | |
|---|---|---|
| *H01M 6/38* | (2006.01) | |
| *H01M 50/60* | (2021.01) | |
| *H01M 50/10* | (2021.01) | |
| *H01M 50/107* | (2021.01) | |
| *H01M 50/636* | (2021.01) | |

(52) U.S. Cl.
CPC ............. *H01M 6/38* (2013.01); *H01M 50/10* (2021.01); *H01M 50/107* (2021.01); *H01M 50/636* (2021.01); *H01M 50/668* (2021.01)

(58) Field of Classification Search
None
See application file for complete search history.

(56) References Cited

FOREIGN PATENT DOCUMENTS

| KR | 10-2011-0017636 A | 2/2011 |
|---|---|---|
| KR | 10-2014-0065861 A | 5/2014 |
| KR | 10-1485897 B1 | 1/2015 |

*Primary Examiner* — Carmen V Lyles-Irving

(57) ABSTRACT

Provided is an ampoule-type reserve battery including: an ampoule casing having an accommodation part formed therein; an electrolyte accommodated in a lower portion of the accommodation part; a leakage prevention liquid made of oil, which is phase-separated from the electrolyte without being mixed therewith so as to prevent the electrolyte from leaking through an upper portion of the accommodation part, and accommodated in the upper portion of the accommodation part; and a separation membrane mounted in the accommodation part and configured to separate the electrolyte from the leakage prevention liquid.

4 Claims, 4 Drawing Sheets

AMPOULE-TYPE RESERVE BATTERY

CROSS-REFERENCE TO RELATED APPLICATION

This application claims the benefit of priority to Korean Patent Application No. 10-2020-0090136, filed on Jul. 21, 2020, which is herein incorporated by reference in its entirety.

TECHNICAL FIELD

The present invention relates to an ampoule-type reserve battery, and more particularly, to an ampoule-type reserve battery in which an electrolyte is prevented from leaking to allow a lifetime thereof to be extended.

TECHNICAL BACKGROUND

A reserve battery is for overcoming the shortcoming of a primary battery which loses a battery function over time due to continuous natural discharge. An electrolyte and an electrode are separated from each other and stored in an inactive state, and the reserve battery has an advantage of allowing a lifetime thereof to be extended by activating the electrolyte to suppress natural discharge when used.

A conventional reserve battery includes an exterior part, an electrolyte storage part formed in the exterior part, a push plate installed below the electrolyte storage part, a guide plate formed outside the push plate, an electrode formed below the guide plate and the push plate, a separation membrane formed between the electrode and the push plate, and a percussion device for striking the push plate. When the conventional reserve battery is used, the push plate moved due to the percussion device destroys a lower surface of the electrolyte storage part in which the electrolyte is stored, and thus the electrolyte is introduced into a lower side of the exterior part to react with the electrode.

Owing to a structure of the electrolyte storage part of the conventional reserve battery, the electrolyte cannot be completely sealed because, when percussed, the push plate or the separation membrane is pushed and inserted into the electrolyte storage part and thus the electrolyte flows out. That is, since the electrolyte is not completely sealed, there is a problem in that storing the electrolyte for a long period of time is difficult. In addition, when only a hole is formed in the push plate due to the percussion device, even though the electrolyte storage part is destroyed by the percussion device, there is a problem in that the electrolyte is not sufficiently transferred to the electrode so that a current is not properly generated.

RELATED ART DOCUMENT

Patent Document (Patent Document 1) Korean Patent Laid-Open Application No. 10-2011-0017636 (publication date: Feb. 22, 2011)
(Patent Document 2) Korean Patent Laid-Open Application No. 10-2014-0065861 (publication date: May 30, 2014)
(Patent Document 3) Korean Registered Patent No. 10-1485897 (registration date: Jan. 19, 2015)

SUMMARY OF INVENTION

The present invention is intended to solve the above problems. The present invention is directed to an ampoule-type reserve battery in which an electrolyte is prevented from leaking to allow a lifetime thereof to be extended.

According to an aspect of the present invention, there is provided an ampoule-type reserve battery including an ampoule part. The ampoule part may include an ampoule casing having an accommodation part formed therein, an electrolyte accommodated in a lower portion of the accommodation part, a leakage prevention liquid made of oil, which is phase-separated from the electrolyte without being mixed therewith so as to prevent the electrolyte from leaking through an upper portion of the accommodation part, and accommodated in the upper portion of the accommodation part, and a separation membrane mounted in the accommodation part and configured to separate the electrolyte from the leakage prevention liquid.

In addition, in the ampoule-type reserve battery, the ampoule casing preferably includes a first case, a stopper, and a second case. The accommodation part may be formed in the first case, and an upper portion of the first case is open. The stopper may be mounted in the upper portion of the first case so as to prevent the leakage prevention liquid from leaking through the upper portion of the first case. The second case may have an upper end to which a fixing part is coupled and a lower portion which is open and in which the first case is inserted to be coupled to the lower portion.

In addition, the ampoule-type reserve battery preferably further includes a housing, the fixing part, the electrode, the percussion pin, and the absorption part. The fixing part may fix the ampoule casing to an upper side of an interior of the housing so as to allow the ampoule casing to fall in the housing when an impact is applied to the housing. The electrode may include a substrate, and a cathode and an anode, which are disposed on an upper end of the substrate, and mounted at a lower side of the interior of the housing by being spaced a predetermined interval from the ampoule part. The percussion pin may be mounted on the substrate to be exposed at an upper end of the electrode and may strike and destroy the ampoule casing accommodating the electrolyte, thereby allowing the electrolyte to be discharged to the substrate when the ampoule part falls. The absorption part may be disposed on the upper end of the electrode and may absorb the electrolyte so as to transfer the electrolyte to the electrode when the electrolyte is discharged.

In addition, in the ampoule-type reserve battery, it is preferable that a groove is formed at one end of a percussion pin in a length direction so as to allow the electrolyte accommodated in the ampoule casing to flow to the absorption part when the percussion pin strikes and destroys the ampoule casing.

BRIEF DESCRIPTION OF DRAWINGS

The above and other objects, features and advantages of the present invention will become more apparent to those skilled in the art by describing exemplary embodiments thereof in detail with reference to the accompanying drawings, in which.

EMBODIMENTS

Figure 1:
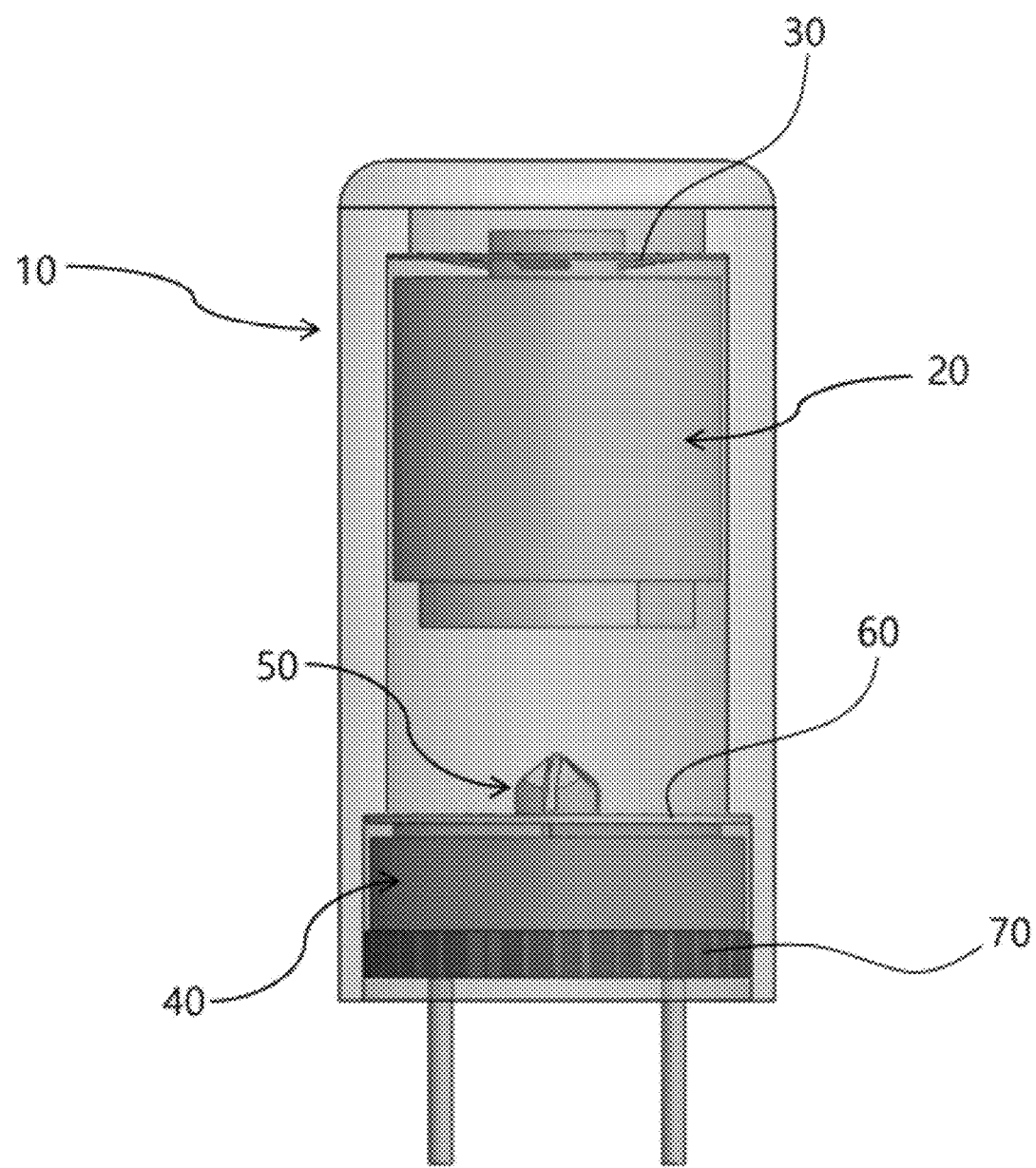
FIG. 1 is a conceptual diagram illustrating an ampoule-type reserve battery according to one embodiment of the present invention.
Figure 2:
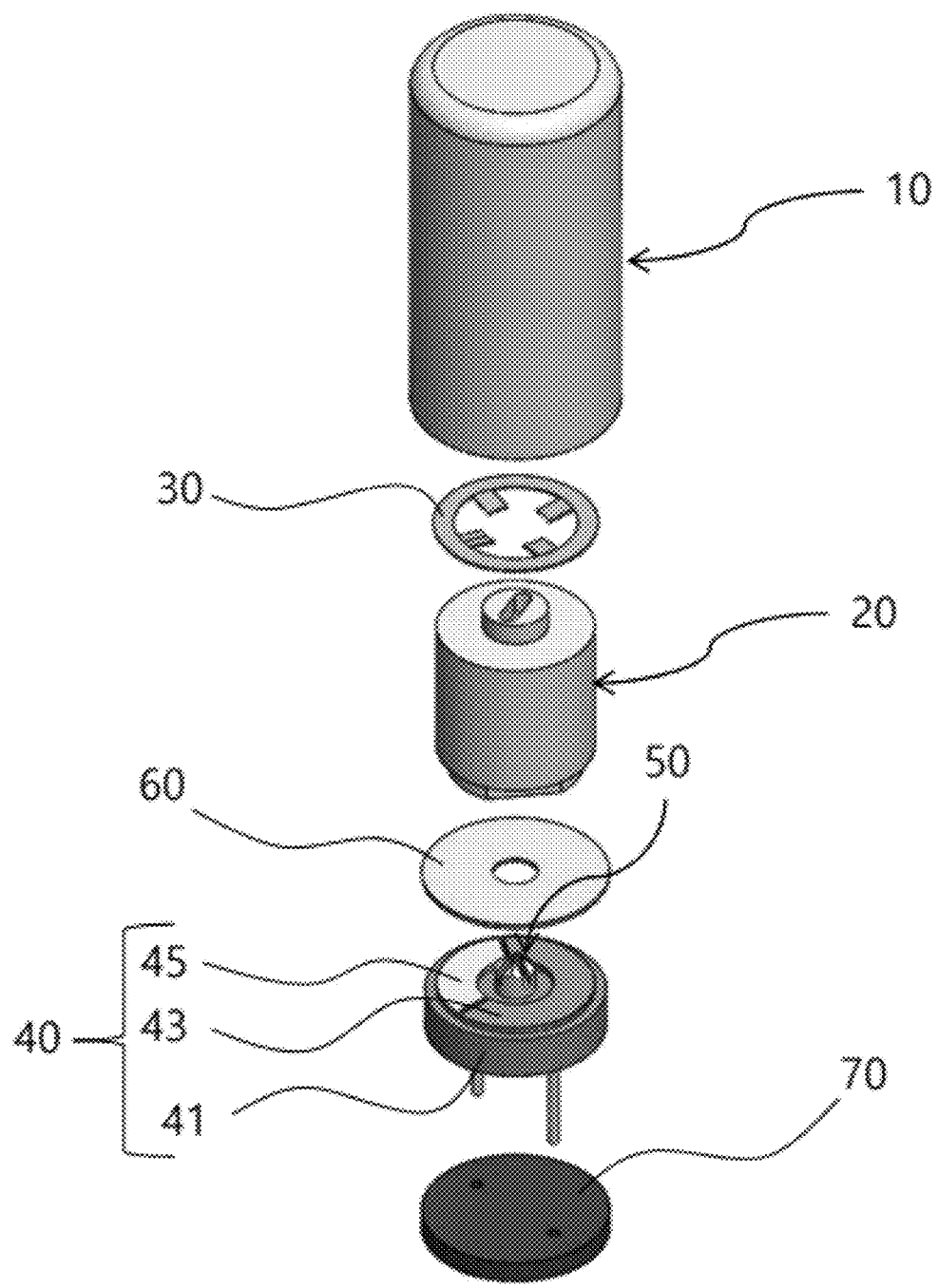
FIG. 2 is an exploded perspective view illustrating the embodiment shown in FIG. 1.
Figure 3:
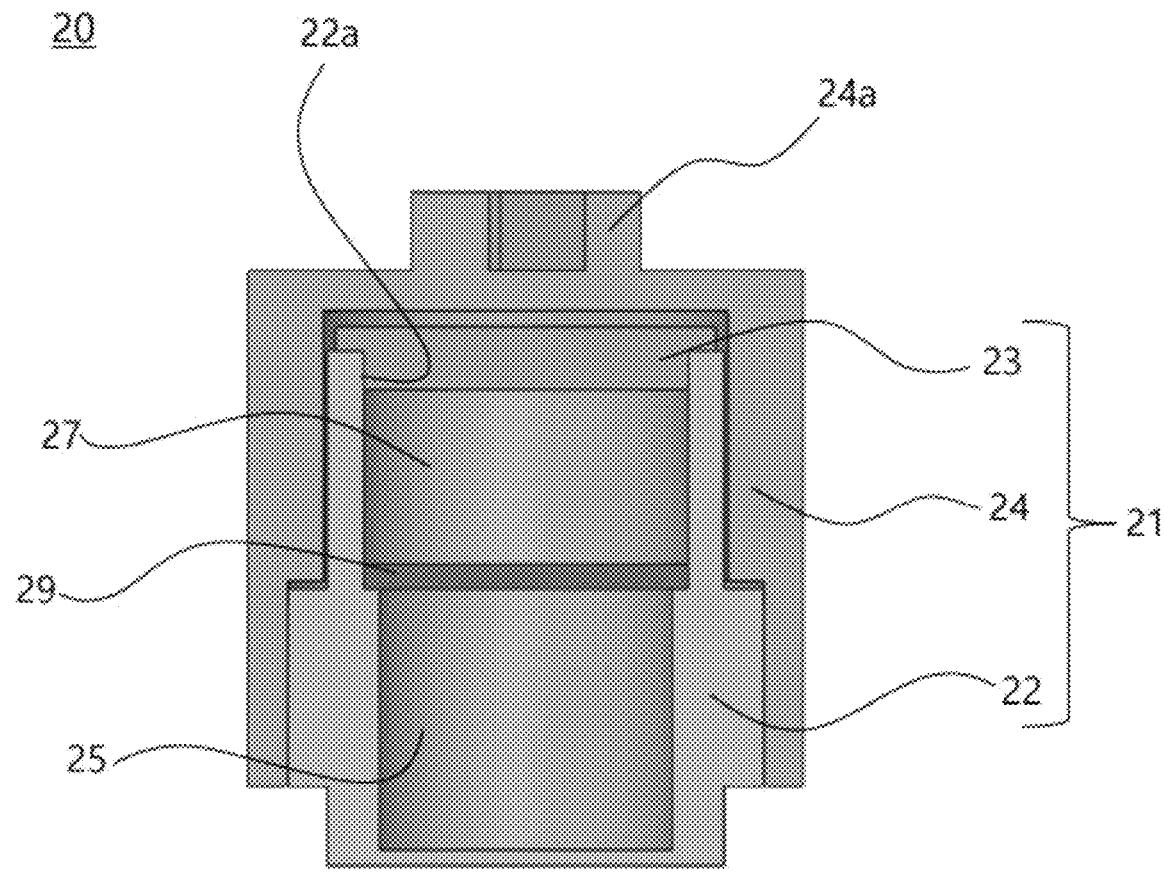
FIG. 3 is a conceptual diagram illustrating an ampoule part of the embodiment shown in FIG. 1.
Figure 4:
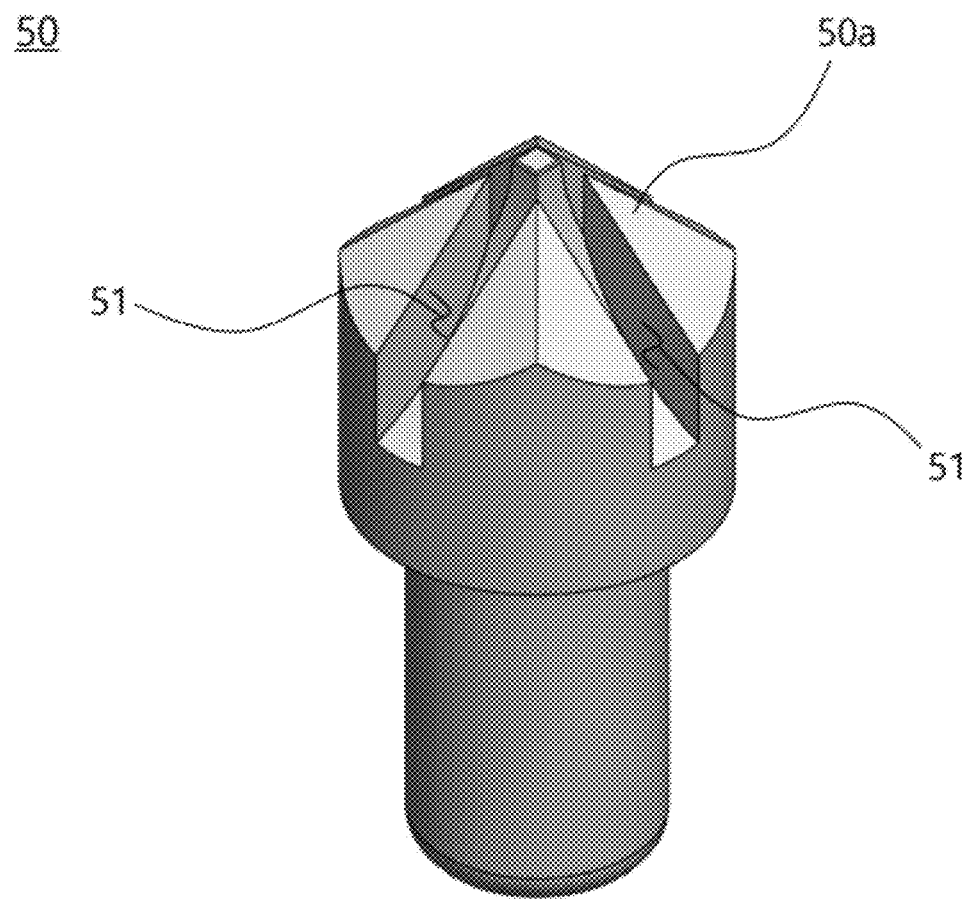
FIG. 4 is a conceptual diagram illustrating a percussion pin of the embodiment shown in FIG. 1.

One embodiment of an ampoule-type reserve battery according to the present invention will be described with reference to FIGS. 1 to 4.

The ampoule-type reserve battery according to the present invention includes a housing 10, an ampoule part 20, a fixing part 30, an electrode 40, a percussion pin 50, an absorption part 60, and a sealing part 70.

The housing 10 has an open lower portion and accommodates the ampoule part 20, the fixing part 30, the electrode 40, the percussion pin 50, and the absorption part 60 therein.

The ampoule part 20 serves to store an electrolyte 25 therein. To this end, the ampoule part 20 includes an ampoule casing 21, the electrolyte 25, a leakage prevention liquid 27, and a separation membrane 29.

The ampoule casing 21 includes a first case 22, a stopper 23, and a second case 24 and accommodates the electrolyte 25 and the leakage prevention liquid 27.

In the first case 22, an accommodation part 22a is formed therein, and thus the electrolyte 25 is accommodated in a lower portion of the accommodation part 22a, the leakage prevention liquid 27 is accommodated in an upper portion of accommodation part 22a, and the upper portion thereof is open.

The stopper 23 serves to prevent the leakage prevention liquid 27 accommodated in the upper portion of the accommodation part 22a from leaking through an upper portion of the first case 22. To this end, the stopper 23 is mounted on the upper portion of the first case 22.

In the second case 24, the fixing part 30 is coupled to an upper end 24a, a lower end of the second case 24 is open, and the first case 22 is inserted and coupled to the second case 24. In this case, the second case 24 is screw-coupled to the first case 22 or is coupled thereto using an adhesive.

The electrolyte 25 is accommodated in the lower portion of the accommodation part 22a of the first case 22 and transferred to the electrode 40 to allow a current to flow.

The leakage prevention liquid 27 serves to prevent the electrolyte 25 from leaking through the upper portion of the accommodation part 22a. To this end, the leakage prevention liquid 27 is made of oil, which is phase-separated from the electrolyte 25 without being mixed therewith, and accommodated in the upper portion of the accommodation part 22a. Since the reserve battery is stored at a temperature ranging from −54° C. to 63° C., oil of which a chemical property is not changed in such temperature conditions should also be used as the leakage prevention liquid 27. In addition, when the leakage prevention liquid 27 is mixed with the electrolyte 25, the electrolyte 25 is diluted. In order to prevent the dilution, oil which is phase-separated from the electrolyte 25 should be used as the leakage prevention liquid 27. When only the electrolyte 25 is stored in the accommodation part 22a of the first case 22, the electrolyte 25 may leak through a gap between the first case 22 and the second case 24 which are screw-coupled. Even when the first case 22 and the second case 24 are coupled using an adhesive, since the adhesive melts in the acid-based electrolyte 25, the electrolyte 25 leaks to the outside so that it is difficult to store the electrolyte 25 in the first case 22 for a long period of time. Since the oil which is phase-separated from the electrolyte 25 is stored in an upper layer of the electrolyte 25, the leakage prevention liquid 27 may serve as a sealing to prevent leakage of the electrolyte 25, thereby allowing the electrolyte 25 to be stored for a long period of time.

The separation membrane 29 may be mounted in the accommodation part 22a of the first case 22 so as to separate the electrolyte 25 from the leakage prevention liquid 27.

The fixing part 30 is coupled to the upper end 24a of the second case 24 to fix the second case 24 to an upper side of an interior of the housing 10. In this case, the fixing part 30 is fixed such that, when an impact is applied to the housing 10, the ampoule part 20 falls in the interior of the housing 10. To this end, it is preferable that the fixing part 30 is formed of an elastic spring to press the upper end 24a of the second case 24 and the upper side of the housing 10.

The electrode 40 includes a substrate 41, a cathode 43, and an anode 45 and is mounted to be spaced a predetermined interval from the ampoule part 20 on a lower side of the interior of the housing 10. When the electrolyte 25 is introduced, the electrode 40 electrochemically reacts with the electrolyte 25 to be activated, thereby generating electricity.

The percussion pin 50 may be mounted on the substrate 41 so as to strike and destroy the ampoule casing 21 when the ampoule part 20 falls. In this case, one end 50a of the percussion pin 50 is exposed at an upper end of the electrode 40. Thus, when the ampoule part 20 falls, a lower portion of the ampoule casing 21 is struck, and thus the electrolyte 25 accommodated in the ampoule casing 21 is discharged to the substrate 41. Here, in the percussion pin 50, a groove 51 is formed in a length direction in the one end 50a to allow the electrolyte 25 accommodated in the lower portion of the accommodation part 22a to flow to the absorption part 60 when a lower portion of the first case 22 of the ampoule casing 21 is destroyed. A plurality of grooves 51 are formed at regular intervals in a circumferential direction so as to allow the electrolyte 25 to be sufficiently transferred to the absorption part 60. Meanwhile, in the percussion pin 50, an end portion of the one end 50a may be formed to be sharp so as to strike and pass through the lower portion of the first case 22 of the ampoule casing 21.

When the electrolyte 25 is discharged, in order to transfer the electrolyte 25 to the electrode 40, the absorption part 60 is disposed on an upper end of the electrode 40 to absorb the electrolyte 25.

The sealing part 70 serves to seal the housing 10. To this end, the sealing part 70 is mounted in a lower portion of the housing 10.

In the present embodiment, the fixing part 30 is coupled to the upper end 24a of the second case 24, and thus the ampoule part 20 accommodating the electrolyte 25 is fixed to the upper side of the interior of the housing 10. In this case, the ampoule part 20 is spaced a predetermined interval from the electrode 40 mounted on the lower side of the interior of the housing 10 to be fixed to the upper side of the interior of the housing 10. When the reserve battery is used and an impact is applied to the housing 10, the upper end 24a of the second case 24 is separated from the fixing part 30 to fall. When the ampoule part 20 falls in the housing 10, the percussion pin 50 strikes and destroys the lower portion of the first case 22. When the one end 50a of the percussion pin 50 is struck such as to pass through the lower portion of the first case 22, the electrolyte 25 flows downward toward the absorption part 60 along the groove 51 of the percussion pin 50. Here, since the groove 51 is formed in the one end 50a of the percussion pin 50, the electrolyte 25 may be sufficiently absorbed into the absorption part 60 along the groove 51. The electrolyte 25 flowing out is absorbed by the absorption part 60 and is uniformly transferred to the cathode 43 and the anode 45 of the electrode 40 and, simultaneously, electricity is generated. Here, the absorption part 60 is disposed at the upper end of the electrode 40 and transfers the electrolyte 25 to the electrode 40 such that the electrolyte 25 and the electrode 40 may react for a long period of time and also an amount of the electrolyte 25 required for a chemical reaction may be minimized.

Meanwhile, the conventional reserve battery is configured such that a push plate moved due to a percussion device destroys a lower surface of an electrolyte storage part in which an electrolyte is stored, and thus the electrolyte is introduced into a lower side of an exterior part to react with an electrode. Thus, due to a structure of the electrolyte storage part, the electrolyte cannot be completely sealed because, when percussed, the push plate or a separation membrane is pushed and inserted into the electrolyte storage part and thus the electrolyte flows out so that there is a problem in that the conventional reserve battery cannot be stored for a long period of time. In addition, when only a hole is formed in the push plate due to the percussion device, even though the electrolyte storage part is destroyed by the percussion device, there is a problem in that the electrolyte is not sufficiently transferred to the electrode so that a current is not properly generated. On the other hand, according to the present invention, the electrolyte 25 is accommodated in the lower portion of the ampoule casing 21, and the leakage prevention liquid 27 is accommodated in the upper portion of the ampoule casing 21. The leakage prevention liquid 27 is made of oil which is phase-separated from the electrolyte 25 without being mixed therewith such that it is possible to prevent the electrolyte 25 from leaking through the upper portion of the ampoule casing 21. Consequently, the reserve battery may be stored for a long period of time and used. In addition, according to the present invention, the groove 51 is formed at one end of the percussion pin 50 in the length direction so as to allow the electrolyte 25 accommodated in the an casing 21 to flow to the absorption part 60 when the percussion pin 50 strikes and destroys the ampoule casing 21. Thus, the electrolyte 25 may be sufficiently absorbed into the absorption part 60 along the groove 51.

In accordance with the present invention, an electrolyte is accommodated in a lower portion of an ampoule casing and a leakage prevention liquid is accommodated in an upper portion of the ampoule casing. The leakage prevention liquid is made of oil which is phase-separated from the electrolyte without being mixed therewith such that the electrolyte can be prevented from leaking through the upper portion of the ampoule casing. Consequently, a reserve battery can be stored for a long period of time and used.

In addition, in accordance with the present invention, a groove is formed at one end of a percussion pin in a length direction so as to allow the electrolyte accommodated in the ampoule casing to flow to an absorption part when the percussion pin strikes and destroys the ampoule casing. Thus, the electrolyte can be sufficiently absorbed into the absorption part along the groove.

As described above, it will be understood that the above described technical configuration of the present invention can be implemented in other specific forms without changing the technical spirit or essential feature of the present invention by those skilled in the art. Therefore, it should be understood that the above described embodiments are not restrictive but illustrative in all aspects, and the scope of the present invention is defined by the appended claims rather than the detailed description, and it should be construed that all alternations or modifications derived from the meaning and scope of the appended claims and the equivalents thereof fall within the scope of the present invention.

What is claimed is:

1. An ampoule-type reserve battery comprising:
   an ampoule casing having an accommodation part formed therein;
   an electrolyte accommodated in a lower portion of the accommodation part;
   a leakage prevention liquid made of oil, which is phase-separated from the electrolyte without being mixed therewith so as to prevent the electrolyte from leaking through an upper portion of the accommodation part, and accommodated in the upper portion of the accommodation part;
   a separation membrane mounted in the accommodation part and configured to separate the electrolyte from the leakage prevention liquid;
   an electrode including a substrate, a cathode and an anode, which are disposed on an upper end of the substrate;
   a percussion pin mounted on the substrate to be exposed at an upper end of the electrode and configured to strike and destroy the ampoule casing accommodating the electrolyte, thereby allowing the electrolyte to be discharged to the substrate when the ampoule casing falls; and
   an absorption pail disposed on the upper end of the electrode and configured to absorb the electrolyte so as to transfer the electrolyte to the electrode when the electrolyte is discharged.

2. The ampoule-type reserve battery of claim 1, wherein the ampoule casing includes:
   a first case in which the accommodation part is formed and which has an open upper portion;
   a stopper mounted in the open upper portion of the first case so as to prevent the leakage prevention liquid from leaking through the open upper portion of the first case; and
   a second case having an upper end to which a fixing part is coupled and a lower portion which is open and in which the first case is inserted to be coupled to the lower portion.

3. The ampoule-type reserve battery of claim 2, further comprising:
   a housing, wherein the fixing part is configured to fix the ampoule casing to an upper side of an interior of the housing so as to allow the ampoule casing to fall in the housing when an impact is applied to the housing,
   wherein the electrode is mounted at a lower side of the interior of the housing by being spaced a predetermined interval from the ampoule casing.

4. The ampoule-type reserve battery of claim 3, wherein a groove is formed at one end of a percussion pin in a length direction so as to allow the electrolyte accommodated in the ampoule casing to flow to the absorption part when the percussion pin strikes and destroys the ampoule casing.

* * * * *